UNITED STATES PATENT OFFICE.

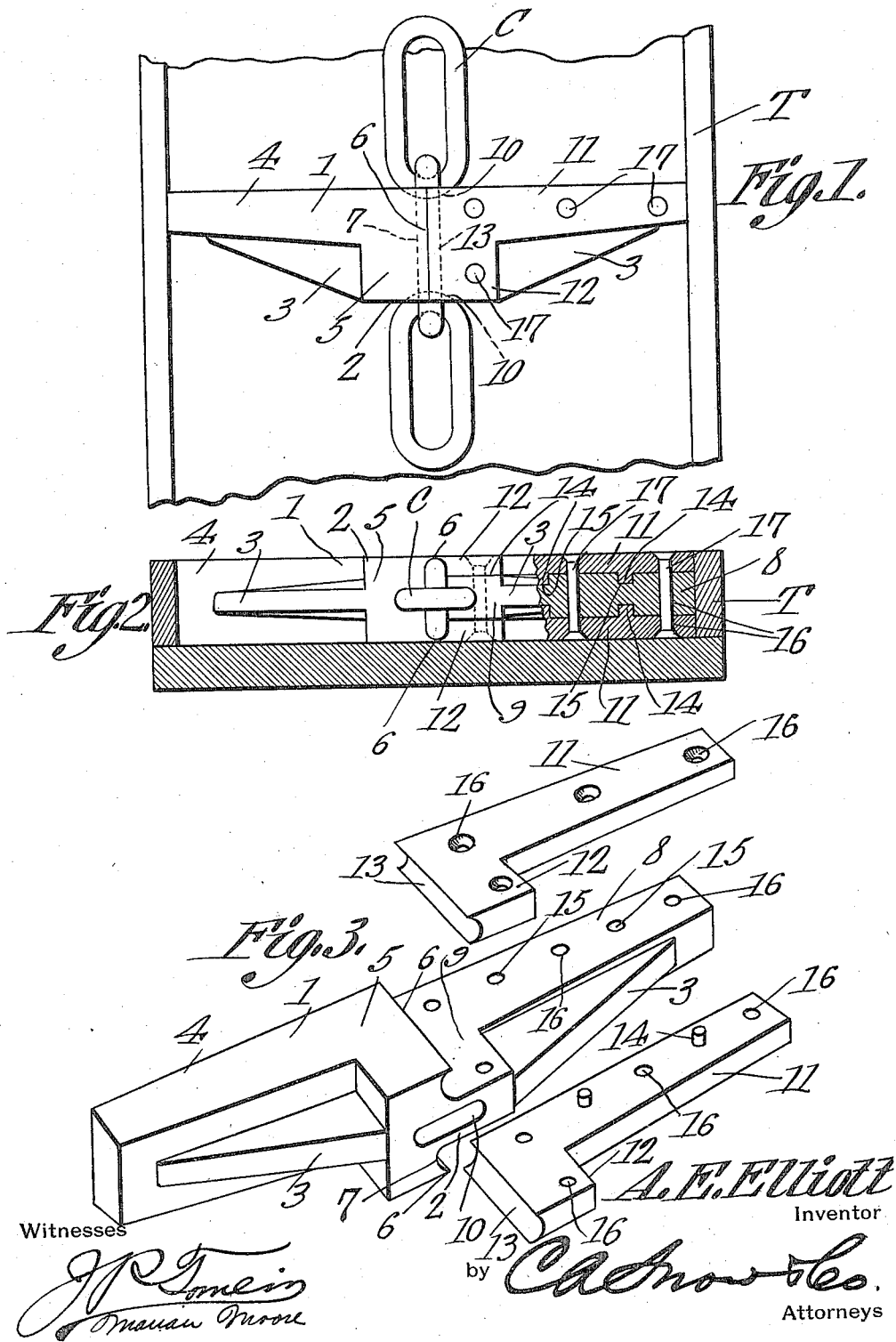

ALONZO E. ELLIOTT, OF RAYMOND, WASHINGTON.

CONVEYER-BUCKET.

1,153,375.  Specification of Letters Patent.  Patented Sept. 14, 1915.

Application filed December 17, 1913. Serial No. 807,295.

*To all whom it may concern:*

Be it known that I, ALONZO E. ELLIOTT, a citizen of the United States, residing at Raymond, in the county of Pacific and State of Washington, have invented a new and useful Conveyer-Bucket, of which the following is a specification.

The present invention appertains to conveyer flights, and aims primarily to provide a novel and improved flight attachable to a conveyer chain, in order to be carried therwith along a trough or race for conveying various materials.

Another object of the present invention is to provide a conveyer flight of such unique or peculiar construction as to enable it to be attached to the link of a conveyer chain in a simple and efficient manner, and to render the flight most effective when the conveyer chain is actuated.

With the foregoing general objects outlined, and with other objects in view, which will be apparent as the nature of the invention is better understood, the present invention resides in the combination and arrangement of parts and in the details of construction hereinafter described and claimed, it being understood that changes in the precise embodiment of the invention herein disclosed can be made within the scope of what is claimed without departing from the spirit of the invention.

The invention has been illustrated in its preferred embodiment in the accompanying drawing, wherein:—

Figure 1 is a plan view of the improved flight as applied to a conveyer chain. Fig. 2 is a rear view of the flight, parts thereof being broken away. Fig. 3 is a perspective view of the flight, the several parts thereof being separated.

The improved flight is designed for attachment to a conveyer chain C working within a trough or race T, fragments of which are illustrated in Figs. 1 and 2, it being understood that the conveyer chain 3 is trained over suitable sprockets, and that the trough or race T may be of any extent for the conveyance of the various materials from one point to another. The conveyer chain embodies a plurality of interengaging oval or elliptical links, and a plurality of the flights are attached at intervals to certain of the chain links so as to work within the trough or race T.

Coming to the improved flight, the same embodies an elongated or rectangular body 1, preferably in the form of a malleable casting, adapted to stand transversely of the conveyer chain, and having a rearwardly projecting head or lug 2 intermediate its ends. The lug or head 2 projects from the back of the body 1, while the other side of the block 1 forms the face which engages the material within the trough or race. Reinforcing ribs or webs 3 connect the lug or head 2 and the end portions of the back of the body 1. One half or end portion of the body 1 is relatively wide, as at 4, and the corresponding half of the lug or head 2 is of the same width, or has its top and bottom faces flush with the top and bottom of the portion 4 of the body. The enlarged portion 5 of the lug or head 2 provides opposite shoulders 6 at the butt end of the reduced portion, which are grooved, as at 7. The other half or end portion of the body 1 is relatively narrow, as at 8, and the corresponding half of the lug or head 2 is of the same width, as at 9. The faces of the reduced end portion or half 8 of the body 1 are flat in order to snugly engage within the sides of a chain link when the reduced portion is inserted through one of the links of a conveyer chain, and in order that the sides of the link will be partially received by the grooves 7 of the shoulders 6. The face of the body 1 is provided with a slight groove or recess 10, and the back of the lug or head 2 is provided with a similar groove or recess 10, the grooves or recesses 10 being adapted to receive the adjoining ends of the chain links engaging that link through which the body is inserted.

In connection with the body 1, there are employed two plates or bars 11 adapted to rest against the top and bottom of the reduced half or end portion 8 of the body, flush with the top and bottom of the enlarged portion 4 of the body. The elongated plates or members 11 are provided at their inner ends with the enlargements 12 adapted to rest against the top and bottom of the half 9 of the head or lug 2, the enlargement 12 or inner ends of the plates 11 being provided with the grooves 13 complementing the grooves 7 of the lug or head. The grooves 13 are adapted to partially receive the sides of the chain link through which the reduced portion of the body is inserted, and the grooves 13 coöperate with the grooves 7 of the shoulder 6, to completely embrace the sides of the links.

Those faces of the plates or members 11 which contact with the section 8 of the body 1, are provided with lugs 14 engageable in sockets or recesses 15 provided in the top and bottom of the section 8. The section 8 of the body and the section 9 of the head 2, are provided with openings or apertures 16, registering with similar apertures 16 provided in the plates 11 and their enlargements 12, rivets or other securing members 17 being securable through the apertures 16 to clamp the plates 11 against the section 8 of the body. The plates or members 11 are preferably cast from malleable metal, in order that the entire flight may be nonbreakable and wear-resisting, and are flush with the respective portions of the body 1.

In applying the present device to a conveyer chain, it is to be understood that the plates or members 11 are detached from the body, the section or half 8 of the body is inserted through the proper link of the chain, until the grooved shoulders 6 engage the side portions of the link, in which event, the members 11 are applied to the body. In applying the members 11, the grooves 13 of the enlargements 12 are engaged with the side portions of the respective link of the chain, and the members 11 are then swung against the section 8 of the body, in order that the lugs 14 will engage the sockets 15 of the said section, to lock the members 11 against displacement. The members 11 will be flush throughout with the body 1 and its lug or head, so as to provide a smooth and unencumbered flight. After the members 11 have been applied to the section 8 of the body, rivets or other securing members 17 are engaged through the registering apertures 16 of the members 11 and the section 8 of the body to securely clamp the said parts together. The entire flight structure will thus be perfectly rigid, and will be rigidly secured to the respective link of the conveyer chain, it being observed that the adjoining links of the chain will engage the depressions 10 in order to lock the flight against longitudinal movement upon the conveyer chain. The engagement of the chain links in the depressions 10 is slightly exaggerated in Fig. 1. As the conveyer chain is actuated, the flight is adapted to work or travel with the trough or race T, as is usual in devices of this character, the present flight being adapted to pass over the sprocket wheels, without the liability of throwing the conveyer chain off of the sprockets.

The present device may be readily and quickly applied to the conveyer chain, and after its application to the chain, it is not liable to slip or become displaced. The present device being constructed of malleable castings, and eliminating entirely wooden parts, will have a long life, as well as carrying out the desired functions in an efficient manner. It is to be understood that the present flight may be constructed in various sizes for application to various conveyer chains, and for use in various sizes of troughs or races.

Having thus described the invention what is claimed as new is:—

A conveyer flight including a body having a reduced portion and opposite shoulders at the butt end of the reduced portion, the faces of the reduced portion being flat to snugly engage within the sides of a chain link, the shoulders being grooved to partially receive the sides of the link, and plates secured to the faces of the reduced portion flush with the respective portions of the body, the inner ends of the plates being grooved to partially receive the sides of the link and coöperating with the aforesaid grooves to embrace the sides of the link.

In testimony that I claim the foregoing as my own, I have hereto affixed my signature in the presence of two witnesses.

ALONZO E. ELLIOTT.

Witnesses:
   MARTIN C. WELSH,
   DALE ELLIOTT.

Copies of this patent may be obtained for five cents each, by addressing the "Commissioner of Patents, Washington, D. C."